US012806741B2

(12) United States Patent
Hsu

(10) Patent No.: US 12,806,741 B2
(45) Date of Patent: Nov. 24, 2026

(54) SELF-HOLDING CLAMP

(71) Applicant: Heng-Yi Hsu, Taina City (TW)

(72) Inventor: Heng-Yi Hsu, Taina City (TW)

( * ) Notice: Subject to any disclaimer, the term of this patent is extended or adjusted under 35 U.S.C. 154(b) by 325 days.

(21) Appl. No.: 18/617,390

(22) Filed: Mar. 26, 2024

(65) Prior Publication Data

US 2025/0303525 A1 Oct. 2, 2025

(51) Int. Cl.
*B25B 5/06* (2006.01)

(52) U.S. Cl.
CPC .................................... *B25B 5/068* (2013.01)

(58) Field of Classification Search
CPC .. B25B 5/00; B25B 5/068; B25B 9/00; B25B 9/02; B25B 9/04; B25B 23/0007; B25B 23/0071; B25B 23/0092; B25B 23/08; B25B 23/142; B25B 23/16; B25B 7/02; B25B 7/04; B25B 7/12; B25B 7/18; B25B 13/02; B25B 13/08; B25B 13/10; B25B 13/102; B25B 13/12; B25B 13/20; B25B 13/48; B25B 13/56; B25B 13/58
USPC ...... 81/13, 44, 125, 489, 491, 487; 294/100, 294/99.1; D8/52, 54, 55, 58; 269/3, 6, 269/89, 90, 91, 92, 93, 95, 97, 98, 165, 269/166, 172
See application file for complete search history.

(56) References Cited

U.S. PATENT DOCUMENTS 3,481,641 A * 12/1969 Berger ..................... G04D 1/02 968/665
4,077,618 A * 3/1978 Durant .................. A01K 97/28 269/130

* cited by examiner

*Primary Examiner* — Brian D Keller
*Assistant Examiner* — Michael Thaddues Farrell, Jr.

(57) ABSTRACT

The present invention discloses a self-holding clamp, comprising a sleeve, an operating member, a tension spring, and a threaded button. The sleeve forms a cavity extending to both ends of the sleeve, and the outer side of the sleeve forms a first clamping jaw. The operating member is configured within the cavity, wherein one end of the operating member protrudes from the sleeve to form a second clamping jaw, and the other end of the operating member protrudes from the sleeve to form a threaded segment, allowing the first clamping jaw and the second clamping jaw to clamp an object in opposition. Furthermore, one end of the tension spring is connected to the sleeve, and the other end is connected to the operating member, thereby providing a clamping force for the first clamping jaw and the second clamping jaw to clamp the object in opposition.

6 Claims, 5 Drawing Sheets

SELF-HOLDING CLAMP

FIELD OF INVENTION

The present invention relates to a tool for clamping objects, in particular to a self-holding clamp.

BACKGROUND OF THE INVENTION

When assembling or repairing equipment, it is often necessary to perform operations to connect or disconnect bolts and nuts. Suppose the nut is positioned in a space that is difficult to access with fingers. In this case, it is difficult for a user to hold and control the nut to enter the space for locking the bolt. It is also difficult for the user to extend his or her fingers into the space to control the nut and perform the operation of disconnecting the bolt and nut.

A known handheld clamp can be used to clamp the nut and insert the nut into the space or remove it from the space. This hand tool comprises a longitudinal sleeve and a longitudinal shaft. One end of the sleeve laterally forms a first protruding plate, the shaft is inserted into the sleeve, and the shaft and sleeve can slide relative to each other along the axial direction. One end of the shaft extends out of the sleeve and laterally forms a second protruding plate, and the first protruding plate and the second protruding plate are opposed to each other.

When the user intends to position the nut between the first protruding plate and the second protruding plate, the user holds the sleeve with one hand and operates the shaft with the other hand to move it axially, thereby increasing or decreasing the distance between the first protruding plate and the second protruding plate, making the distance slightly larger than the outer diameter of the nut. Next, while maintaining the distance between the first protruding plate and the second protruding plate, the user must free one hand to hold the nut and place the nut between the first protruding plate and the second protruding plate. Then, with one hand controlling the position of the nut between the first protruding plate and the second protruding plate, and the other hand operating the shaft to move, cause the first protruding plate and the second protruding plate to abut against the two opposite sides of the nut, thereby clamping the nut in opposition, and then, using this long handheld clamp to reach the nut into the space, and releasing the clamping of the nut by operating the shaft after the bolt and nut are screwed together.

Since the user needs to control the sleeve and shaft with both hands to complete the operation of increasing or decreasing the distance between the first protruding plate and the second protruding plate, and also needs to control the positioning of the nut between the first protruding plate and the second protruding plate, there is room for improvement in the overall operating convenience.

SUMMARY OF THE INVENTION

The main purpose of the present invention is to provide a self-holding clamp.

In order to achieve the aforementioned purpose, the present invention adopts the following technical solution:

A self-holding clamp comprising:

- a sleeve, which is a longitudinal structure having an internal cavity, one end of the sleeve being defined axially as a first end and the other end being defined as a second end, the cavity extending to the first end and the second end, and the outer side of the sleeve forming a first clamping jaw;
- an operating member configured within the longitudinal structure of the cavity, one end of the operating member protruding from the sleeve through the first end and forming a second clamping jaw on one side, the other end of the operating member protruding from the sleeve through the second end to form a threaded segment; the second clamping jaw and the first clamping jaw being opposed to each other, thereby allowing the first clamping jaw and the second clamping jaw to clamp an object in opposition to each other;
- a tension spring disposed in the cavity, one end of the tension spring being connected to the sleeve and the other end being connected to the operating member, thereby elastically pulling the operating member to provide a clamping force for the first clamping jaw and the second clamping jaw to clamp the object in opposition; and
- a threaded button screwed onto the threaded segment, and the second end forming a stop for the threaded button.

The main effect and advantage of the present invention is that the user can hold the sleeve with one hand and complete the operation of controlling the reciprocating movement of the operating member by pressing or releasing the threaded button with high operating convenience.

DETAILED DESCRIPTION OF THE PREFERRED EMBODIMENTS

Figure 1:
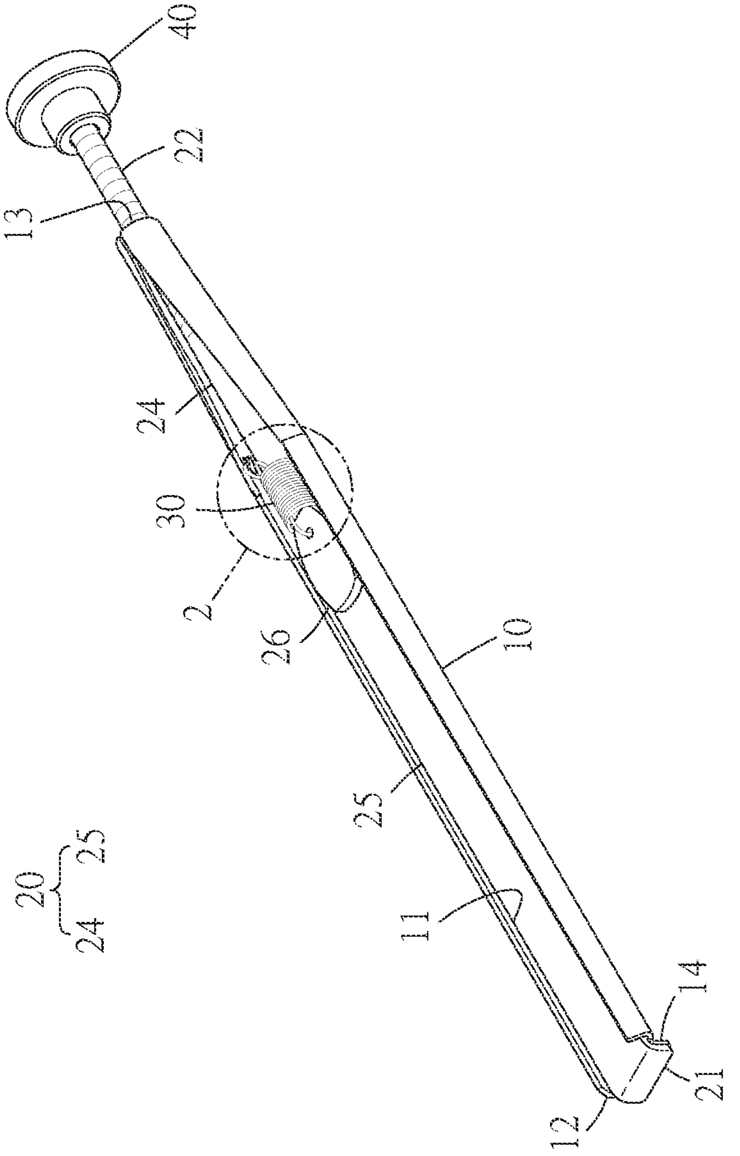
FIG. 1 is a perspective view of a preferred embodiment of the present invention.
Figure 2:
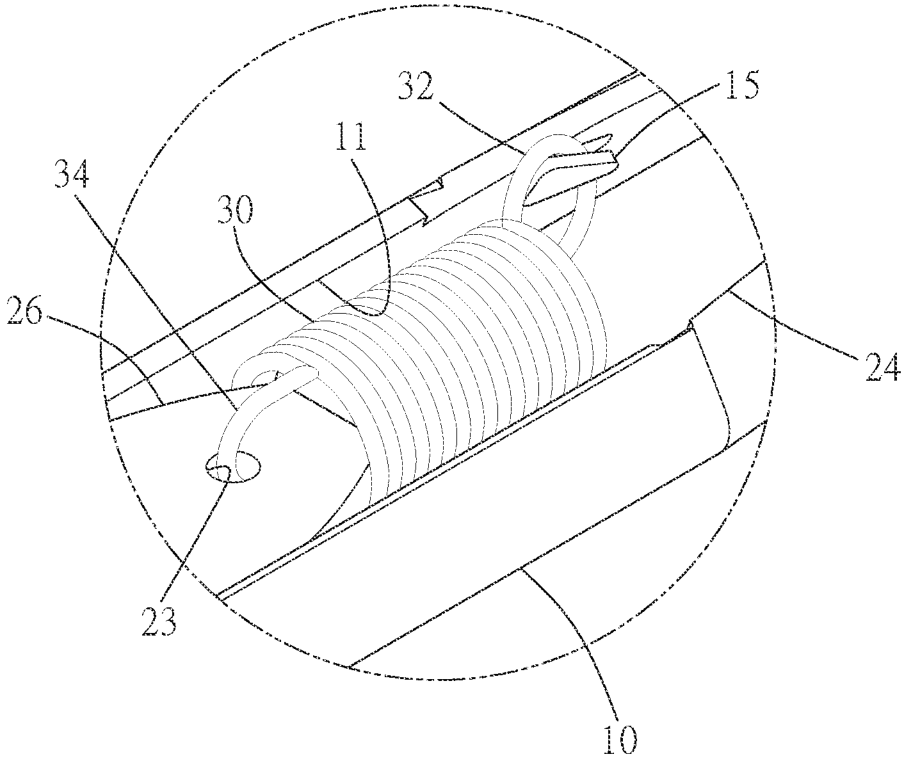
FIG. 2 is a partially enlarged view of FIG. 1.
Figure 3:
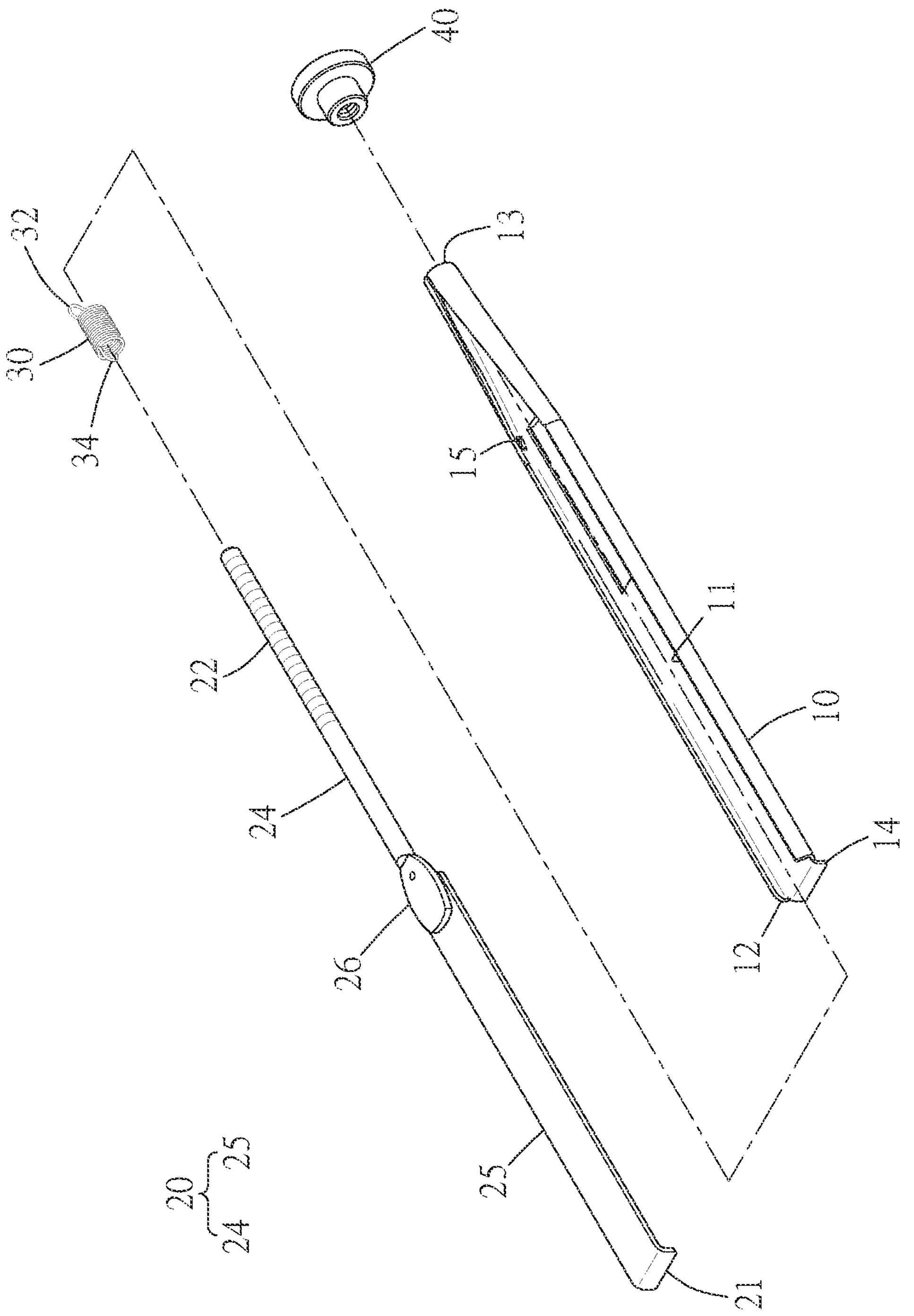
FIG. 3 is an exploded perspective view of the preferred embodiment of the present invention.

Please refer to FIGS. 1 to 5, which show a preferred embodiment of a self-holding clamp of the present invention. However, this embodiment is only for illustrative purposes and should not be construed as limiting the scope of the patent application.

The preferred embodiment of the self-holding clamp comprises a sleeve 10, an operating member 20, a tension spring 30, and a threaded button 40, wherein the sleeve 10 is a longitudinal structure having an internal cavity 11, one end of the sleeve 10 being defined axially as a first end 12 and the other end being defined as a second end 13, the cavity 11 extending to the first end 12 and the second end 13, and the outer side of the sleeve 10 forming a first clamping jaw 14.

The first clamping jaw 14 is selectively formed by laterally bending the sleeve 10 and is selectively connected to the first end 12.

The operating member 20 is configured within the longitudinal structure of the cavity 11, one end of the operating member 20 protruding from the sleeve 10 through the first end 12 and forming a second clamping jaw 21 on one side, the other end of the operating member 20 protruding from the sleeve 10 through the second end 13 to form a threaded segment 22. The second clamping jaw 21 and the first clamping jaw 14 are opposed to each other, thereby allowing the first clamping jaw 14 and the second clamping jaw 21 to clamp an object 90 in opposition to each other.

Figure 4:
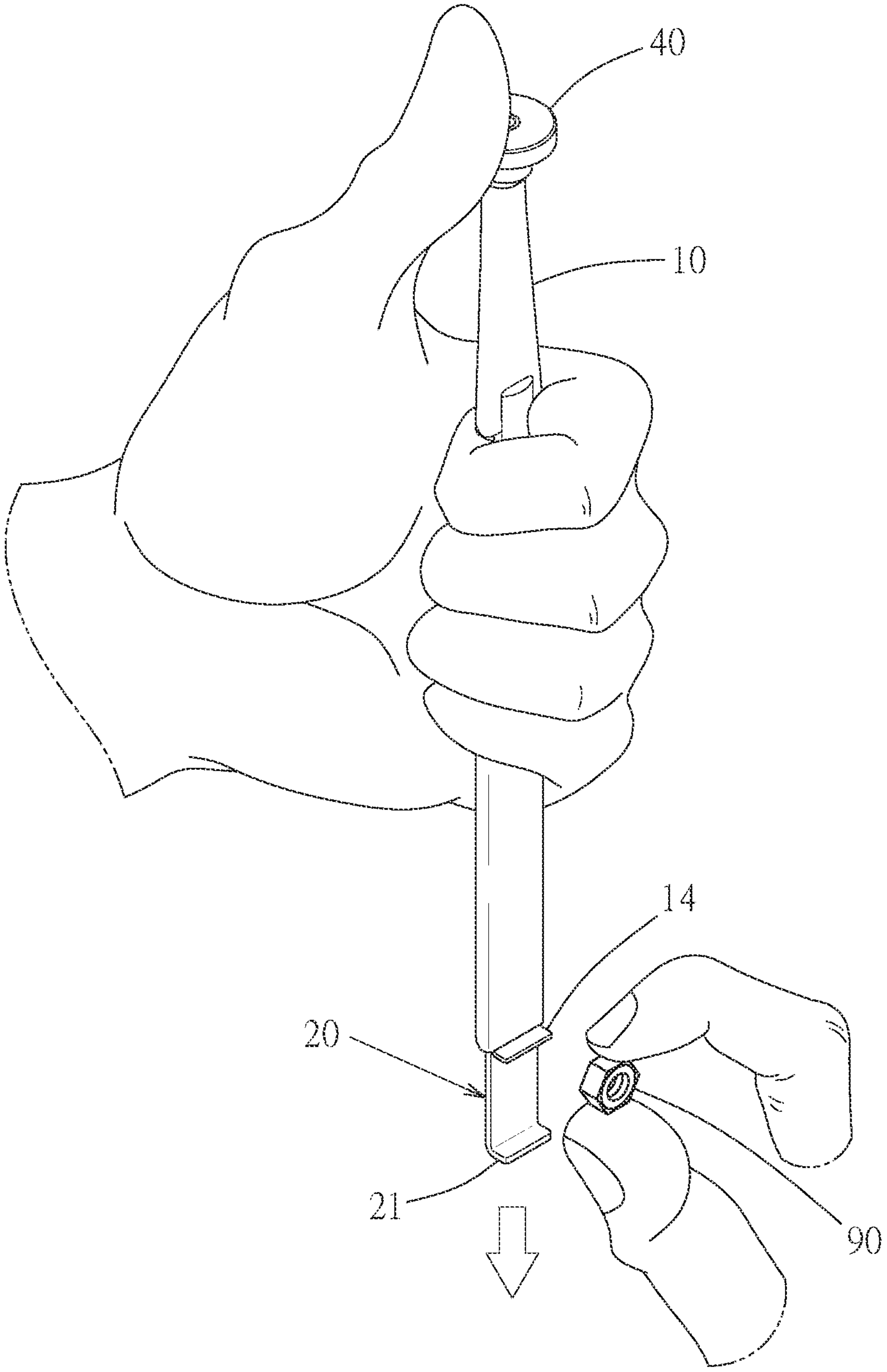
FIG. 4 is a perspective view of the state of use of the preferred embodiment of the present invention showing the operational state of increasing the distance between the first clamping jaw and the second clamping jaw.
Figure 5:
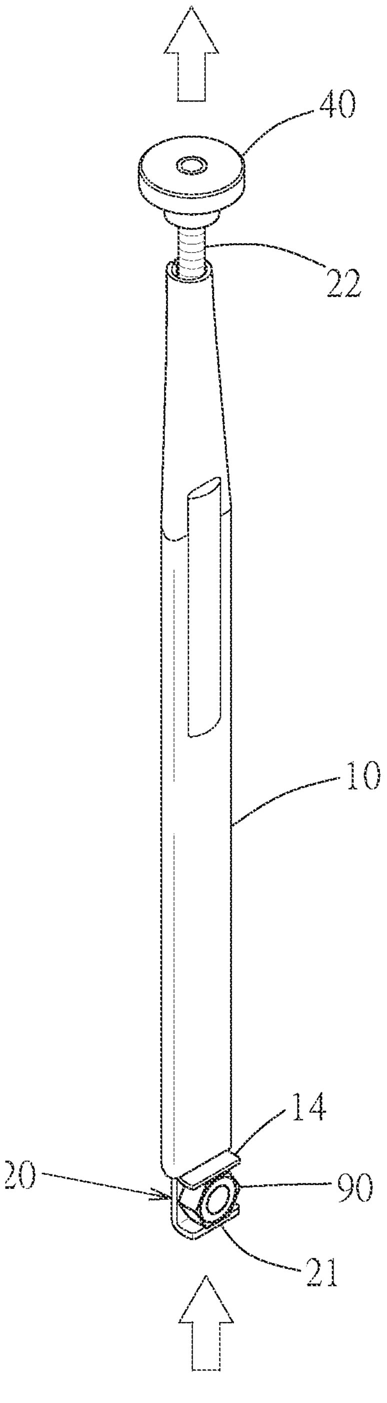
FIG. 5 is a perspective view of the state of use of the preferred embodiment of the present invention showing the operational state in which the first clamping jaw and the second clamping jaw clamp a nut.

The second clamping jaw 21 is selectively formed by laterally bending the end of the operating member 20. FIGS. 4 and 5 illustrate an operational state in which the object 90 is a nut, however, the object 90 may also be other objects, and FIGS. 4 and 5 should not be construed as limiting the intended use of the preferred embodiment.

The tension spring 30 is disposed in the cavity 11, one end of the tension spring 30 being connected to the sleeve 10 and the other end being connected to the operating member 20, thereby elastically pulling the operating member 20 to provide a clamping force for the first clamping jaw 14 and the second clamping jaw 21 to clamp the object 90 in opposition.

In a preferred implementation option, the tension spring 30 is in a pre-tensioned state when the sleeve 10 and the operating member 20 are not subjected to an external force. At this time, the first clamping jaw 14 and the second clamping jaw 21 are in contact with each other, allowing the first clamping jaw 14 and the second clamping jaw 21 to clamp objects 90 of relatively small sizes. When the sleeve 10 and the operating member 20 are not subjected to the external force, the first clamping jaw 14 and the second clamping jaw 21 can also be selected to be separated by an appropriate distance, thus forming an implementation option obtained from a variation of the preferred embodiment.

The threaded button 40 is screwed onto the threaded segment 22, and the second end 13 forms a stop for the threaded button 40.

Before the threaded button 40 is screwed onto the threaded segment 22, the tension spring 30 is first threaded axially onto the operating member 20, with one end of the tension spring 30 connected to the operating member 20. Then, the operating member 20 is inserted into the cavity 11 through the first end 12 and the threaded segment 22 protrudes from the sleeve 10 through the second end 13. Next, the other end of the tension spring 30 is connected to the sleeve 10, and the threaded button 40 is screwed onto the threaded segment 22, thereby completing the assembly of the preferred embodiment.

As shown in FIG. 4, a user holds the sleeve 10 with one hand and presses the threaded button 40 with the thumb, causing the operating member 20 to move in the direction of further protruding from the first end 12 and increasing the distance between the first clamping jaw 14 and the second clamping jaw 21. At this time, the operating member 20 pulls the tension spring 30 to stretch elastically. The user can then position the object 90 between the first clamping jaw 14 and the second clamping jaw 21, and release the control to press the threaded button 40. Since the tension spring 30 provides an elastic force, it causes the operating member 20 to move rapidly in the opposite direction. As shown in FIG. 5, the elastic force of the tension spring 30 allows the first clamping jaw 14 and the second clamping jaw 21 to effectively clamp the object 90 in the opposite direction.

Since the user can hold the sleeve 10 with one hand and complete the operation of controlling the reciprocating movement of the operating member 20 by pressing or releasing the threaded button 40. Thus, the other hand of the user can hold the object 90 to be placed between the first clamping jaw 14 and the second clamping jaw 21, thereby providing high operating convenience.

When the threaded button 40 is positioned between the end of the threaded segment 22 and the second end 13, the aforementioned operation of controlling the movement of the operating member 20 by pressing the threaded button 40 may alternatively be changed to pressing the end of the threaded segment 22.

In addition to utilizing the elastic force of the tension spring 30 to enable the first clamping jaw 14 and the second clamping jaw 21 to clamp the object 90, when it is relatively difficult to use the self-restoring force of the spring to provide a self-holding effect on the object 90 (for example, when the object 90 has a relatively large mass), the user can further choose to rotate the threaded button 40 to make the threaded button 40 abut tightly against the second end 13. The abutting action of the threaded button 40 on the operating member 20 can further enhance the stability of the first clamping jaw 14 and the second clamping jaw 21 in clamping the object 90.

When the preferred embodiment is for clamping an object 90 with elasticity or compressibility, the threaded button 40 can be used to tightly abut the second end 13, which further causes the first clamping jaw 14 and the second clamping jaw 21 to relatively force the object 90 to elastically deform or compress, thereby increasing the stability of the clamping.

The sleeve 10 forms a hook 15 toward the cavity 11, and the hook 15 is selectively formed by pressing the outer periphery of the sleeve 10 using a stamping method, causing a portion of the sleeve 10 to deform toward the cavity 11. One end of the tension spring 30 forms a first bent hook 32 that can engage the hook 15.

In addition, the operating member 20 forms a hooked hole 23, and one end of the tension spring 30 forms a second bent hook 34 that can engage the hooked hole 23. The hooked hole 23 is preferably located between the hook 15 and the first end 12.

The operating member 20 is mainly composed of an elongated rod 24 and an elongated plate 25 which are axially connected. The elongated rod 24 forms the threaded segment 22, and one end of the elongated plate 25 is bent laterally to form the second clamping jaw 21.

In this embodiment, one end of the elongated rod 24 is selectively stamped to form a flat, plate-like connecting end 26 that is attached to the elongated plate 25, and welding or adhesive means are used to fix the connecting end 26 to the elongated plate 25.

The operating member 20 may also be integrally formed by the elongated rod 24 and the elongated plate 25, where a rod having an elongated shape may be used as the elongated rod 24, which is processed using a stamping method to form the elongated plate 25.

The width of the cavity 11 at the first end 12 corresponds to the width of the elongated plate 25, and the width of the cavity 11 at the second end 13 corresponds to the outer diameter of the elongated rod 24, thereby allowing the sleeve 10 to restrict the axial sliding path of the operating member 20 and ensuring that the sleeve 10 can move along the axial direction without lateral deviation.

What is claimed is:

1. A self-holding clamp, comprising:

a sleeve, which is a longitudinal structure having an internal cavity, one end of the sleeve being defined axially as a first end and the other end being defined as a second end, the cavity extending to the first end and the second end, and an outer side of the sleeve forming a first clamping jaw;

an operating member configured within the longitudinal structure of the cavity, one end of the operating member protruding from the sleeve through the first end and forming a second clamping jaw on one side, another end of the operating member protruding from the sleeve through the second end to form a threaded segment; the second clamping jaw and the first clamping jaw being opposed to each other, thereby allowing the first clamping jaw and the second clamping jaw to clamp an object in opposition to each other;

a tension spring disposed in the cavity, one end of the tension spring being connected to the sleeve and another end being connected to the operating member, thereby elastically pulling the operating member to provide a clamping force for the first clamping jaw and the second clamping jaw to clamp the object in opposition; and a threaded button screwed onto the threaded segment, and the second end forming a stop for the threaded button;

wherein the operating member is mainly composed of an elongated rod and an elongated plate which are axially connected, the elongated rod forms the threaded segment, and one end of the elongated plate is bent laterally to form the second clamping jaw.

2. The self-holding clamp according to claim 1, wherein the sleeve forms a hook toward the cavity, and one end of the tension spring forms a first bent hook that engages the hook.

3. The self-holding clamp according to claim 2, wherein the operating member forms a hole, and one end of the tension spring forms a second bent hook that engages the hole.

4. The self-holding clamp according to claim 3, wherein the hole is located between the hook and the first end.

5. The self-holding clamp according to claim 1, wherein a width of the cavity at the first end corresponds to a width of the elongated plate, and a width of the cavity at the second end corresponds to an outer diameter of the elongated rod, thereby allowing the sleeve to restrict an axial sliding path of the operating member.

6. The self-holding clamp according to claim 1, wherein the tension spring is in a pre-tensioned state.

* * * * *